J. C. HOLMES.
CORN CULTIVATOR.
No. 97,921.  Patented Dec. 14, 1869.
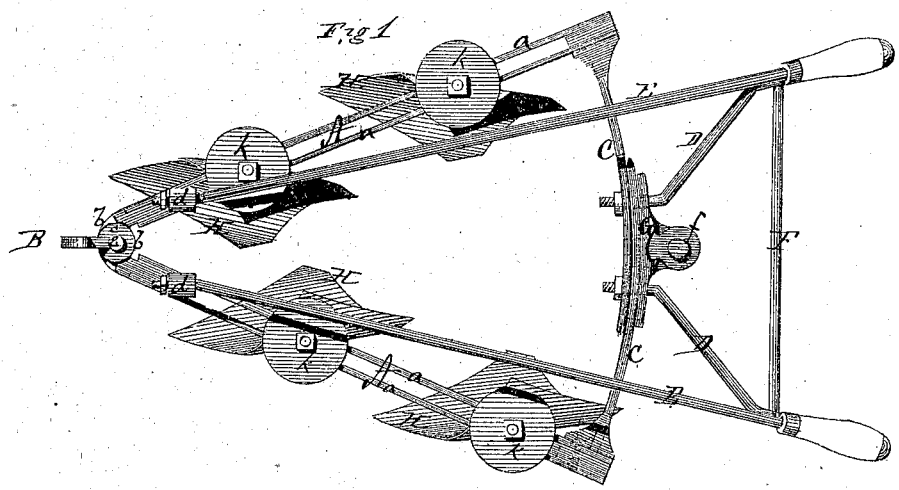
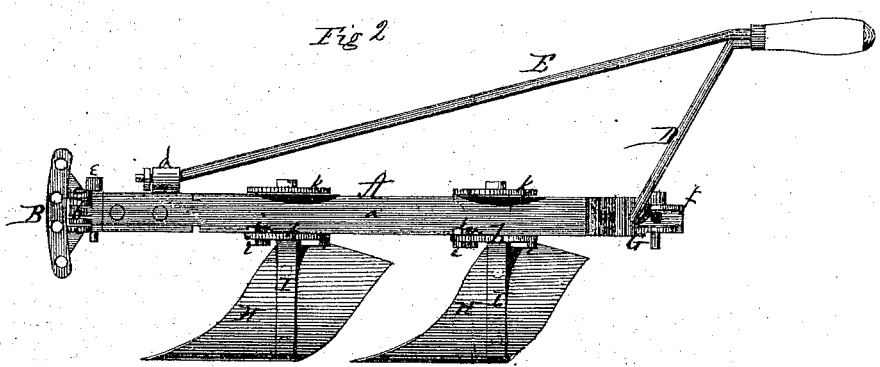

United States Patent Office.

JOHN C. HOLMES, OF WYOMING, PENNSYLVANIA.

Letters Patent No. 97,921, dated December 14, 1869.

IMPROVEMENT IN CORN-CULTIVATORS.

The Schedule referred to in these Letters Patent and making part of the same.

*To all whom it may concern:*

Be it known that I, JOHN C. HOLMES, of Wyoming, in the county of Luzerne, and in the State of Pennsylvania, have invented certain new and useful Improvements in Corn-Cultivators; and do hereby declare that the following is a full, clear, and exact description thereof, reference being had to the accompanying drawings, and to the letters of reference marked thereon, making part of this specification.

The nature of my invention consists in the construction and general arrangement of a "corn-cultivator," as will be hereinafter fully set forth.

In order to enable others skilled in the art to which my invention appertains, to make and use the same, I will now proceed to describe its construction and operation, referring to the annexed drawings, in which—

Figure 1 is a plan view, and
Figure 2 is a side elevation of my machine.
Figure 3 is a view showing the manner of securing the plow-shanks.

A A represent the two main beams of the cultivator.

These beams consist each of two bars, $a\ a$, of suitable thickness, placed a short distance apart, and provided at each end with blocks between them, and secured by screw-bolts and nuts, thus actually forming a slotted beam, as seen in fig. 1.

At one end, the beams A A are provided with rounded ears, $b\ b$, through which a pin, $e$, is passed, thus pivoting the two beams together at one end.

The pin $e$ also pivots the clevis B, which is provided with a series of holes, as seen in fig. 2, so as to attach the team high or low, as may be desired.

At the other end of the beams A A, on the inner side, are curved bars, C C, which lap over each other, and provided with a series of holes, through which the rods D D are passed, said rods being secured by nuts on the inner or front side.

The rods D D extend downward from the handles E E, which are connected by the rod F, and extend forward to near the pivoted ends of the side beams A A, where they are passed through loops, $d\ d$, and held by nuts or burs.

The handles E E can be reversed when it is desired to run the cultivator in the opposite direction, in which case the front ends of the handles are passed through the curved bars C C, and the rods D D through the loops $d\ d$.

The clevis B is provided with rounded ears, $c\ c$, which embrace the ears $b\ b$ of the beams A A, and the pin $e$ passes through said ears also, to hold the clevis.

When it is desired to run the cultivator in the opposite direction, the clevis is removed from its position at the pivoted ends of the beams A A and placed on ears $f$ of a bar, G, which is placed on the outside of the bars C C, and secured by the rods D D, or the handles passing through the same.

The plows H H, of the peculiar construction shown in figs. 1 and 2, are secured to the shanks I I, and held to the beams A A in the following manner:

The shank I is passed through a circular plate, $h$, having projections, $i\ i$, on both sides, so arranged that the bars $a\ a$, of the beam A, will pass between them, and consequently prevent the plate from turning.

The shank I is placed between the two bars $a\ a$, the plate $h$ being placed under the same.

Another plate, $k$, is then placed on the shank on the upper side of the beam A, and the whole secured by a nut.

The projections $i\ i$ allow the plate $h$, and consequently, also, the plow H, to be turned at different angles, and the plows may also be reversed at pleasure, so as to turn the soil to or from the corn, potatoes, cotton, or tobacco, as the case may be.

Having thus fully described my invention,
What I claim as new, and desire to secure by Letters Patent, is—

1. The beams A A, constructed as described, each consisting of two bars $a\ a$, connected together at suitable distance apart, and provided at one end with ears $b\ b$, by means of which the beams are joined together, substantially as shown and described.

2. The combination of the beams A A with ears $b\ b$, clevis B with ears $c\ c$, curved bars C C, and bar G with ears $f\ f$, all constructed as described and for the purposes set forth.

3. The reversible handles E E, connected by means of the rod F, and provided with the rods D D, substantially as and for the purposes herein set forth.

4. The combination of the beams A A with loops $d\ d$, clevis B, curved bars C C, bar G, reversible handles E E, and rods D D and F, all constructed and arranged substantially as and for the purposes herein set forth.

5. The reversible plows H H, secured to the beams A A by means of the shanks I I, and plates $h\ k$, substantially as shown and described.

6. The plate $h$, provided with projections $i\ i$, and passed over the plow-shank I, substantially as and for the purposes herein set forth.

7. The combination and arrangement of the beams A A, clevis B, bars C C and G, reversible handles E E, and plows H H, all constructed and connected substantially as and for the purposes herein set forth.

In testimony that I claim the foregoing, I have hereunto set my hand, this 27th day of August, 1869.

JOHN C. HOLMES.

Witnesses:
HENRY WOODHOUSE,
J. W. SAX.